(12) United States Patent
Falter et al.

(10) Patent No.: US 9,816,575 B2
(45) Date of Patent: Nov. 14, 2017

(54) CALIPER DISK BRAKE OF A VEHICLE

(71) Applicant: WABCO Europe BVBA, Brussels (BE)

(72) Inventors: Wolfgang Falter, Heidelberg (DE);
Oliver Friebus, Heidelberg (DE);
Hellmut Jager, Ludwigshafen (DE);
Hans-Christian Jungmann,
Gorxheimertal (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 14/787,655

(22) PCT Filed: May 2, 2014

(86) PCT No.: PCT/EP2014/001175
§ 371 (c)(1),
(2) Date: Oct. 28, 2015

(87) PCT Pub. No.: WO2014/183839
PCT Pub. Date: Nov. 20, 2014

(65) Prior Publication Data
US 2016/0169307 A1 Jun. 16, 2016

(30) Foreign Application Priority Data

May 13, 2013 (DE) .................. 10 2013 008 161

(51) Int. Cl.
*F16D 65/097* (2006.01)
*F16D 55/22* (2006.01)
(Continued)

(52) U.S. Cl.
CPC ......... *F16D 65/0978* (2013.01); *F16D 55/22* (2013.01); *F16D 55/225* (2013.01);
(Continued)

(58) Field of Classification Search
CPC ............ F16D 65/0006; F16D 65/0068; F16D 65/095; F16D 65/0978; F16D 55/225; F16D 2055/0041
See application file for complete search history.

(56) References Cited

U.S. PATENT DOCUMENTS 6,179,095 B1   1/2001 Weiler et al.
2008/0067016 A1* 3/2008 Pritz .................... F16D 55/225
                                                    188/73.38

(Continued)

FOREIGN PATENT DOCUMENTS

DE        19626299 A1    1/1998
DE     102007019429 A1   10/2008
(Continued)

*Primary Examiner* — Vishal Sahni
(74) *Attorney, Agent, or Firm* — Leydig, Voit & Mayer, Ltd.

(57) ABSTRACT

A caliper disk brake of a vehicle with a brake disk, a brake caliper, a brake anchor plate, a force transmission element guided and supported in a shaft of the brake caliper or of the brake anchor plate, a holding-down spring for holding down the force transmission element, and a holding-down device held and supported on the caliper by a holding device, pretensions the holding-down spring radially against the force transmission device and pretensions the holding-down spring tangentially in the direction of rotation against the force transmission device during forwards travel. The holding device has a center line parallel to the axis of rotation of the brake disk. The tangential pre-tensioning is at least partially attributed to the dimensions of the holding-down device, as measured in the tangential direction from the center line, being larger at least in sections on the disk exit side than on the disk entry side.

17 Claims, 13 Drawing Sheets

(51) Int. Cl.
 *F16D 65/00* (2006.01)
 *F16D 55/225* (2006.01)
 *F16D 55/00* (2006.01)

(52) U.S. Cl.
 CPC .... *F16D 65/0068* (2013.01); *F16D 2055/007* (2013.01); *F16D 2055/0041* (2013.01)

(56) References Cited

U.S. PATENT DOCUMENTS

| | | | | |
|---|---|---|---|---|
| 2010/0116600 | A1* | 5/2010 | Wolf, Jr. | F16D 65/0978 188/73.31 |
| 2010/0230220 | A1* | 9/2010 | Keller | F16D 65/092 188/73.31 |
| 2010/0276232 | A1* | 11/2010 | Keller | F16D 65/0977 188/73.31 |
| 2011/0005872 | A1* | 1/2011 | Baumgartner | F16D 65/0978 188/73.31 |
| 2011/0226566 | A1* | 9/2011 | Zenzen | F16D 65/095 188/72.4 |

FOREIGN PATENT DOCUMENTS

| | | |
|---|---|---|
| DE | 10 2007 049 979 A1 | 4/2009 |
| DE | 10 2007 046 945 A1 | 5/2009 |
| DE | 10 2011 115 304 B3 | 2/2013 |
| DE | 10 2013 008 155 A1 | 11/2014 |
| DE | 10 2013 008 160 A1 | 11/2014 |
| DE | 10 2013 012 547 A1 | 1/2015 |
| DE | 10 2013 015 002 A1 | 3/2015 |
| EP | 0 694 707 A2 | 1/1996 |

\* cited by examiner

CALIPER DISK BRAKE OF A VEHICLE

FIELD OF THE INVENTION

The present invention generally relates to a caliper disk brake of a vehicle, such as a commercial vehicle.

BACKGROUND OF THE INVENTION

Conventionally, a caliper disk brake includes a brake disk having an axis of rotation, a brake caliper, a back plate assembly, a force transmission element, such as a brake-pad plate and/or a pressure plate (which is guided and supported in a channel of the brake caliper or the back plate assembly), a hold-down spring for holding down the force transmission element and a hold-down device, which is held and supported on the caliper by a holding device having a centerline lying parallel to the axis of rotation. The hold-down device pre-stresses the hold-down spring radially against the force transmission device and pre-stresses the hold-down spring against the force transmission device tangentially in the direction of rotation in forward travel of the vehicle. Brakes of this general type under consideration are disclosed, for example, in EP 694 707 B3. A characteristic feature of such brakes is the axial offset of the hold-down yoke by way of an eccentric interlocking support in the brake caliper, in order to exert not only radial but also tangential pre-stressing on the brake linings via the positively interlocking engagement in the hold-down springs formed for this purpose.

The basic principle of radial and tangential pre-stressing has proved its worth and should be retained. However, there is a need for design and functional modifications to the brake caliper and to the relevant parts of the hold-down system to afford greater efficiency and greater versatility.

FIGS. 1 and 2 herein show the brake according to EP 694 707 B3. FIG. 1 shows a brake lining 11, which is guided and supported radially inwards and on both sides in a circumferential direction in a channel guide of the brake caliper or back plate assembly, and on the radially outer edge of which lining a hold-down spring is supported, which is symmetrically formed to both sides of its center axis. Centrally, the hold-down spring comprises a radially deeper center area 3, from which the higher spring legs 6, 7 extend outwards on both sides along the outer edge of the lining, in order for the ends to then exert a spring action on the brake lining when a likewise symmetrically formed hold-down yoke 1 engages with a positive interlock in the here radially inward formed center area.

The hold-down yoke 1 is formed from round material. The spring pre-stressing occurs when the hold-down yoke 1, as in FIG. 2, is anchored on the actuation side in interlock openings of the brake caliper, and on the other side is then fixed firmly but detachably by means of bolts to a bearing block of the brake caliper on the wheel-rim side. The hold-down yoke extends over a caliper opening serving for the fitting/removal of brake linings, supported on both sides of the brake disk, and in a direction towards the brake or center axis A.

In the axial direction of the brake linings, the hold-down springs are coupled to the brake lining, because radial shoulders 12, 14 of the outer edge of the brake lining pass through elongated openings 8, 9, 10 in the spring. At the ends, the spring legs bear against further radial shoulders 13, 13 of the outer edge of the brake lining. The hold-down springs are embodied as leaf springs.

The radial and tangential pre-stressing acting on the brake lining by means of the hold-down spring is generated in that the hold-down yoke 1 engages with a positive interlock in the radially formed center area 3 of the hold-down spring and in turn is supported by positive interlock in actuation and wheel rim-side anchorages of the brake caliper, always offset towards the brake disk run-out side by an axial offset x relative to the center or brake axis A, in the direction of rotation of the brake disk in forward travel. As a result, the corresponding spring leg is also forced in a tangential direction. For the eccentric positively interlocking support of the hold-down yoke 1, the requisite design shapes must be provided at corresponding positions in the brake caliper casting, and these design shapes then still have to undergo machining operations. The bearing points for the hold-down yoke 1 are therefore formed asymmetrically on/in the brake caliper.

The relevant brakes are fitted on both sides of the axle, so that they too need to be of mirror-symmetrical design. This means that different casting pattern designs are required for a left-hand brake and a right-hand brake in order to produce the asymmetrical support and holding areas. Accordingly, the positions of the subsequent machining operation for the support and holding areas in the case of a left-hand brake are different from those in that of a right-hand brake.

Owing to the aforementioned asymmetry, this principle with different caliper designs is an obstacle to economic and cost-efficient production of the brake calipers mass-produced by casting and machining.

SUMMARY OF THE INVENTION

Generally speaking it is an object of the present invention to improve upon the brake described in EP 694 707 B3, particularly with respect to its manufacture in a more efficient and more versatile manner. According to embodiments of the present invention, this object can be achieved in a caliper disk brake of the general type under consideration where the tangential pre-stressing is at least partially attributable to the dimensions of the hold-down device, measured in a tangential direction from the centerline, being at least in part greater on the disk run-out side than on the disk run-in side.

The holding device for the hold-down device, that is the support areas for a hold-down yoke on the caliper, can be designed symmetrically if the tangential pre-stressing of the hold-down spring originates not from an asymmetry of the caliper, but rather an asymmetry of the hold-down device. Advantageously, the brake calipers of mirror-symmetrical design in the holding and support areas for the hold-down device on each axle in this respect no longer require different molds to form the casting design shape. Furthermore, the subsequent machining can be standardized.

Consequently, besides the relevant brake itself, the present invention also contemplates a cast brake caliper, the holding device of which for holding and supporting the hold-down device is symmetrical in relation to a radial plane containing the centerline, in so far as its contour is pre-defined by the casting process. As used herein, the term symmetry predefined by casting signifies that one mold of correspondingly symmetrical contour is used for the entire production of the contour of the holding device, whereas asymmetries originating from machining operations performed after casting, such as the asymmetrical introduction of one or more bored holes and/or asymmetrical machining operations for processing of the surface, are within the scope of the inventive embodiments.

According to an embodiment of the present invention, the holding device may comprise a projection extending in the direction of the axis of rotation, the lateral flanks of which serve to absorb tangential forces and the radially inner flank of which serves to absorb radial forces. Furthermore, the projection is preferably of roof edge-like design. That is, according to this embodiment, there is a positively interlocking holding area for the hold-down device. It is formed as a positively interlocking block in the casting and towards the side of the brake disk or the hold-down device comprises a roof edge-like projection, against which the corresponding end of the hold-down yoke is radially supported when bilateral lugs also correspondingly engage around the outer faces of the interlocking block. In the fitted position, the positive interlock is thereby established symmetrically. The projection of the holding device is preferably on the actuation side.

According to another embodiment, the holding device may comprise a coding device. This serves to ensure that only one hold-down device matching the brake caliper is fitted to the caliper. The coding device may comprise a shoulder. Such a shoulder can be left as a protrusion when machining the face. The shape and positioning of the shoulder are in principle quite arbitrary. For coding in such a case, a corresponding aperture is formed in a corresponding position on the associated hold-down device, so that only this hold-down device fits onto the brake or matches the caliper. It is thereby possible to create a coding, which ensures the correct hold-down device is assigned to the left-hand or right-hand brake and/or ensures the correct hold-down device in view of the size of the brake to be equipped.

Additionally or alternatively, gripper hooks can be formed extensively between the support block contour and formed on the hold-down yoke. If these parts and connection areas correspond congruently it is thereby likewise possible to ensure the correct assignment.

According to an embodiment, the holding device preferably comprises a threaded connection device. This creates an especially simple design type.

According to an embodiment, the coding device and/or the threaded connection device may be situated on the wheel rim-side. If they are not formed by casting, neither the coding device nor the threaded connection device needs to be of symmetrical design in relation to the radial plane containing the centerline.

The inventive embodiments can be applied both to a fixed caliper and to a sliding caliper.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The present invention is discussed in more detail below on the basis of preferred exemplary embodiments, referring to the accompanying drawings, in which.

DETAILED DESCRIPTION OF THE PREFERRED EMBODIMENTS

Figure 1:
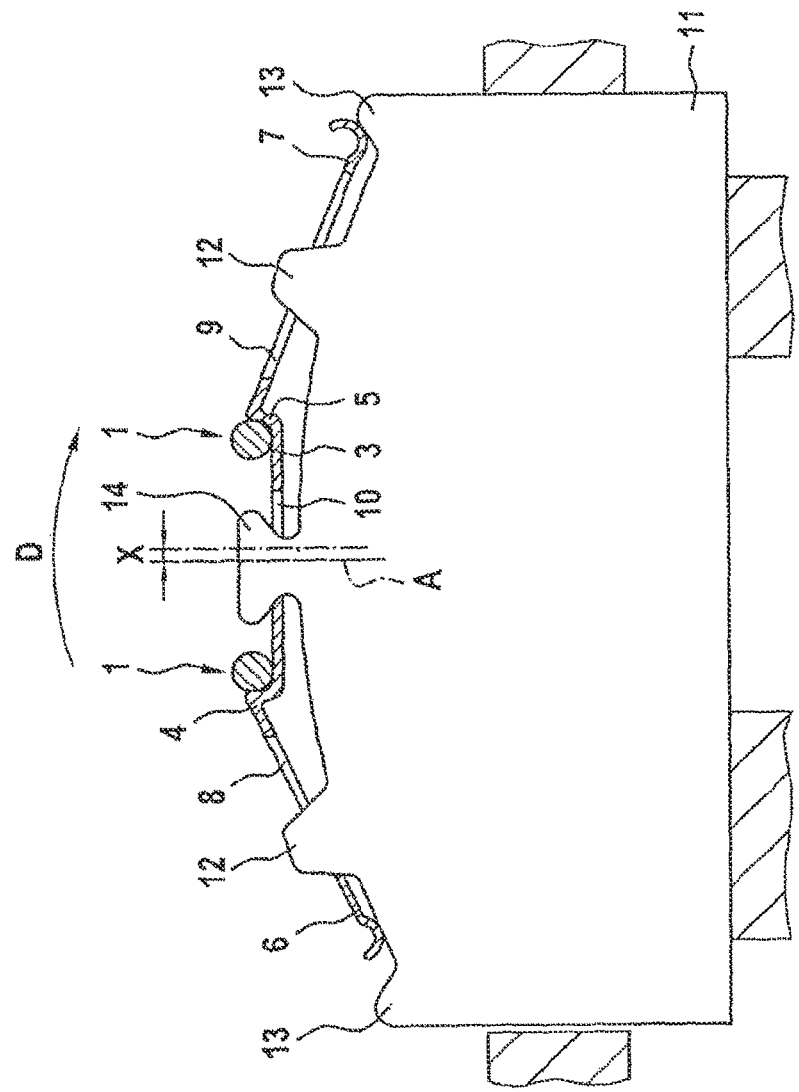
FIGS. 1 and 2 show conventional caliper disk brakes.
Figure 2:
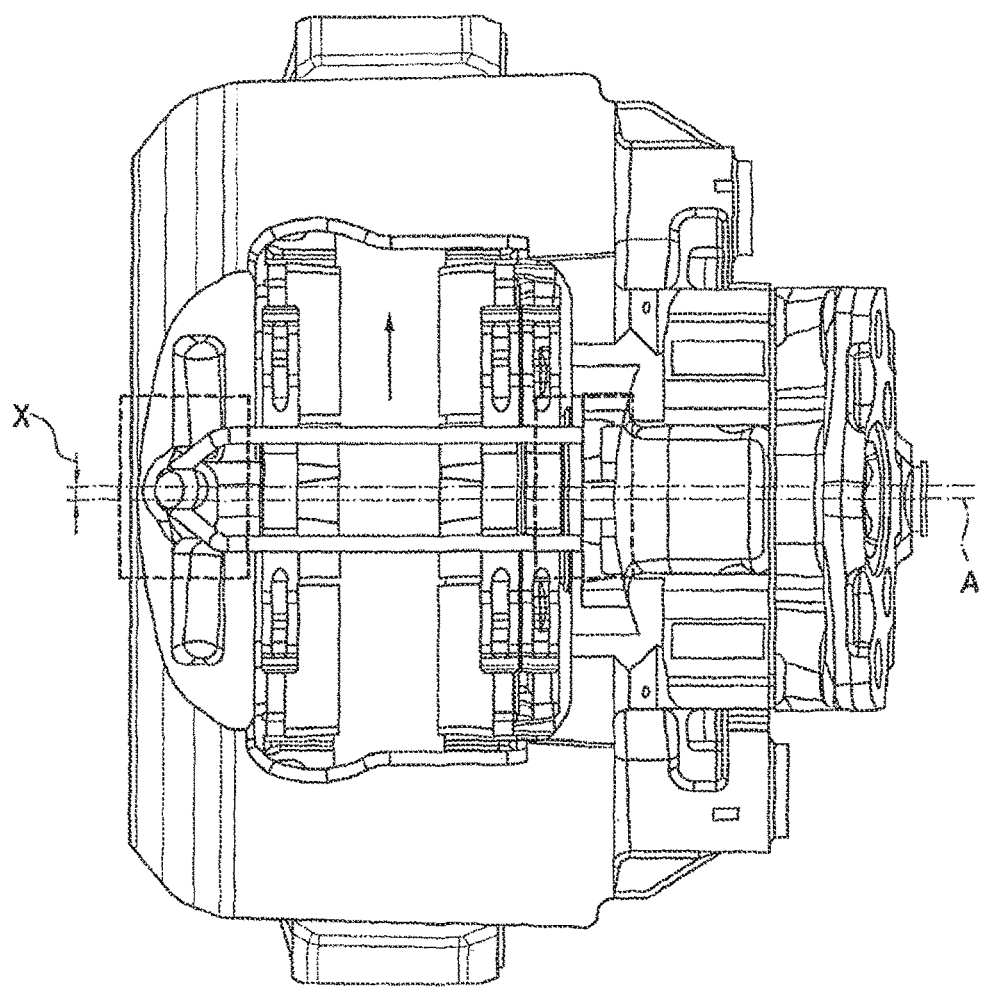
Figure 3:
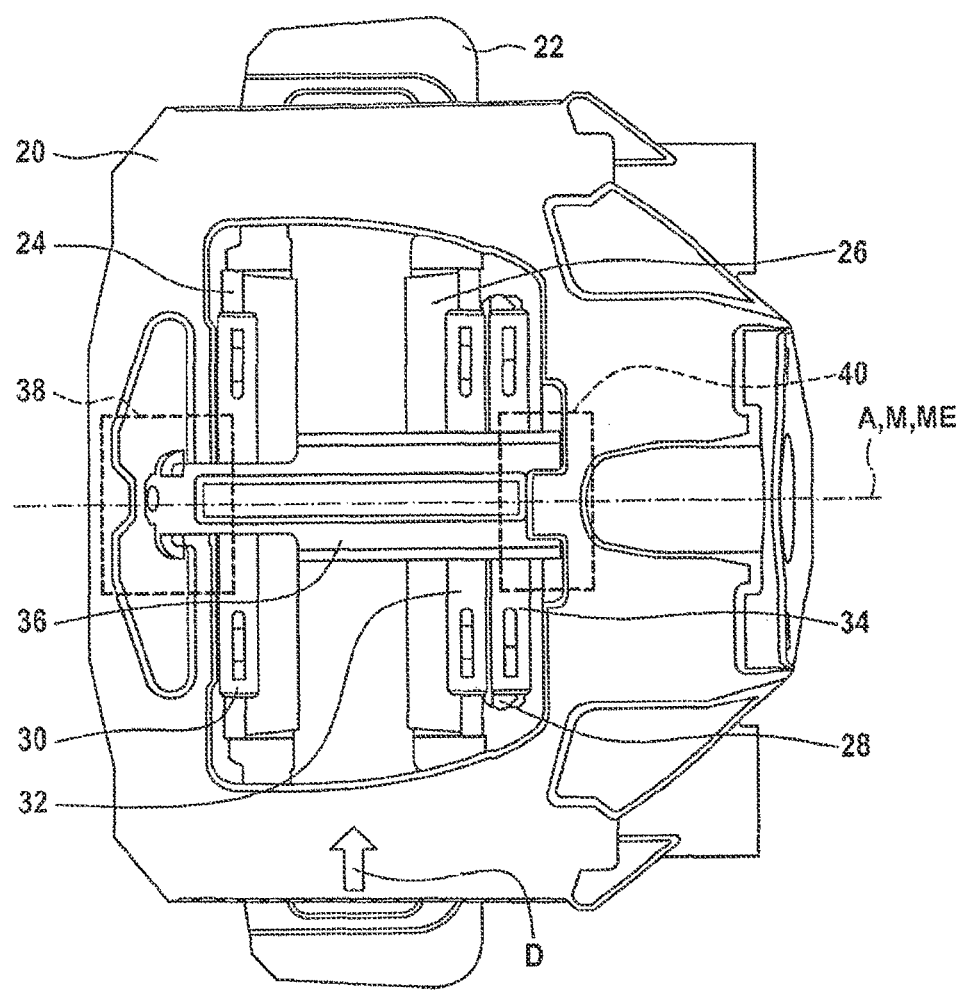
FIGS. 3 and 4 are diagrammatic top views of a caliper disk brake according to one exemplary embodiment of the present invention.
Figure 4:
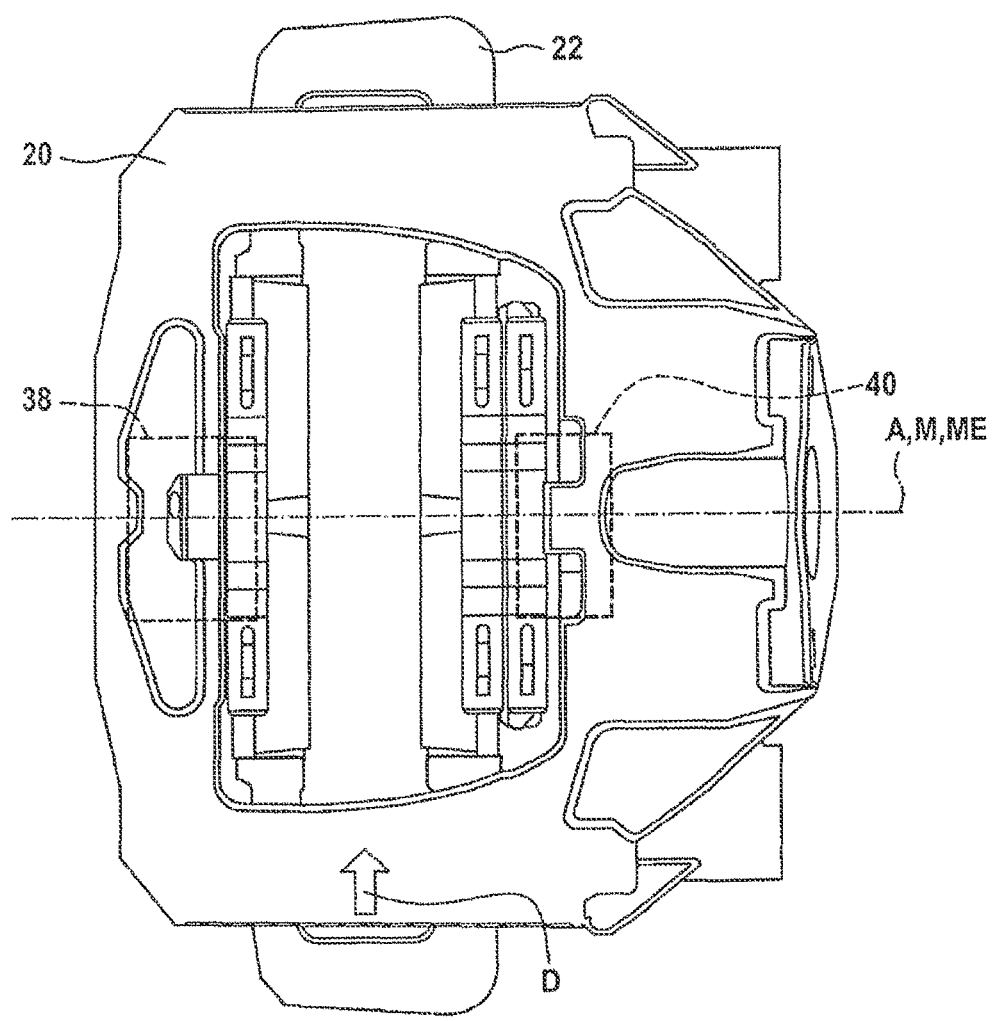
Figure 5:
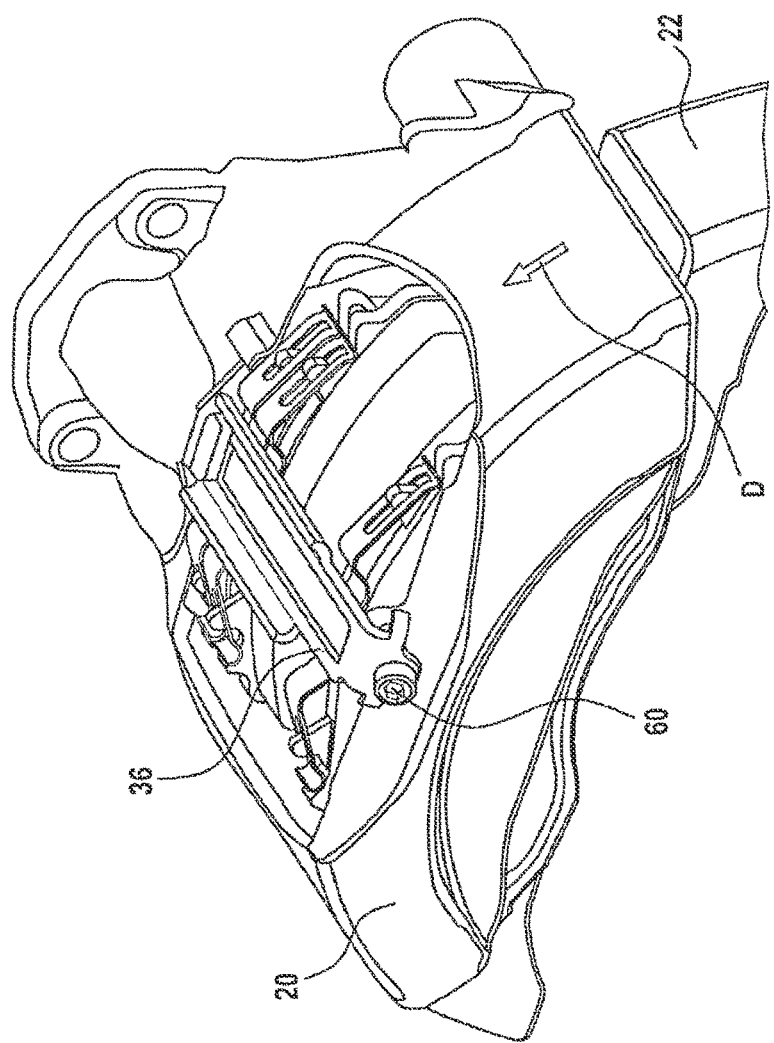
FIG. 5 is a diagrammatic, perspective view of the brake according to FIGS. 3 and 4.
Figure 6:
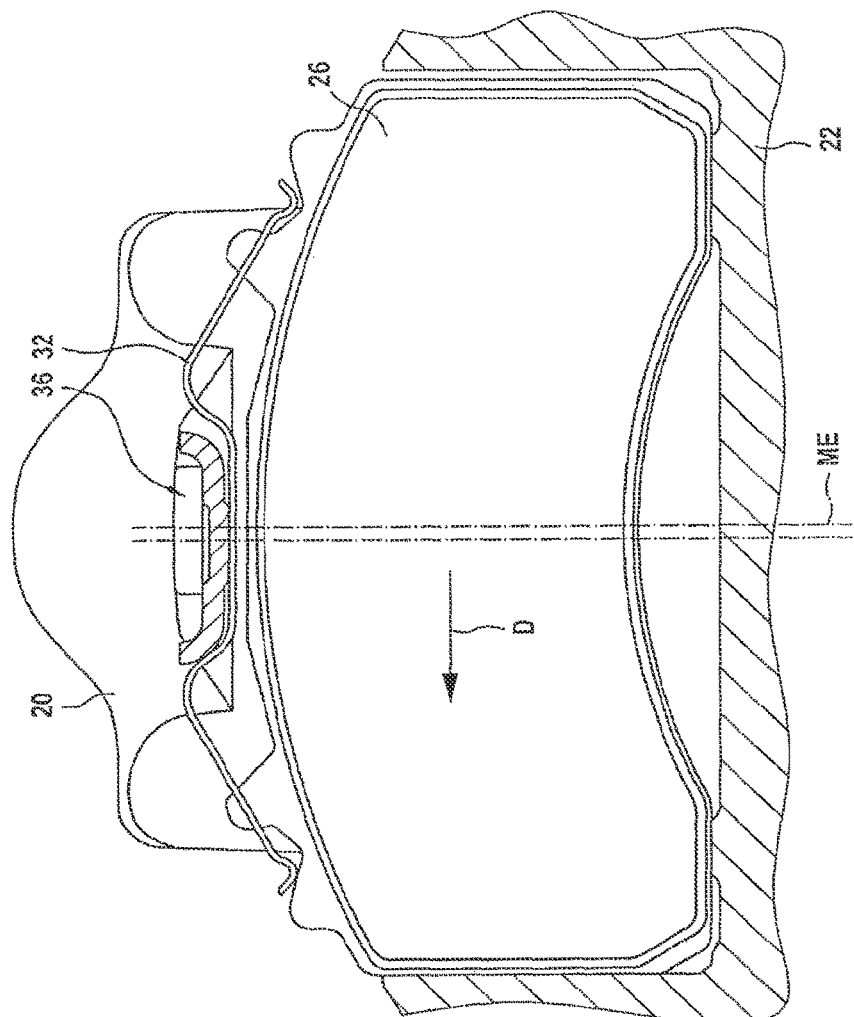
FIG. 6 is a diagrammatic, sectional view of the brake according to FIGS. 3 and 4.

An exemplary embodiment of a caliper disk brake according to the present invention comprises a brake disk, the axis of rotation of which is denoted by A. The direction of rotation in forward vehicle travel is denoted by an arrow D. The brake comprises a brake caliper 20 and a back plate assembly 22, the brake caliper gripping around the brake disk like a frame. A wheel rim-side brake lining, comprising a metal backing plate with friction lining, is denoted by the reference numeral 24, an actuation-side brake lining, comprising a metal backing plate with friction lining, by the reference numeral 26 and a pressure plate by the reference numeral 28. The elements specified are force transmission elements. They are held down by hold-down springs 30, 32 and 34, that is they are pre-stressed in a radial direction. As is explained further below, the brake lining 26 and the pressure plate 28 are also pre-stressed in a tangential direction.

A hold-down device in the form of a hold-down yoke 36, which extends over a caliper opening for the fitting/removal of the brake linings supported on both side of the brake disk, serves to hold down the hold-down springs 30, 32 and 34. Here, the hold-down yoke 36 is responsible not only for the radial pre-stressing of the hold-down springs 30, 32 and 34 but also for the tangential pre-stressing of the hold-down springs 32 and 34. By contrast, only a radial pre-stressing, but not a tangential pre-stressing, acts on the hold-down spring 30 and the brake lining 24. Moments originating from a tangential pre-stressing of the hold-down spring 30 and the brake lining 24, which are detrimental to the operation of the brake and which effect the free sliding of the sliding caliper, are thereby avoided.

The brake caliper 20, which in the exemplary embodiment represented in the drawings is a sliding caliper, comprises a holding device for holding and supporting the hold-down yoke 36. This holding device comprises two areas, that is a wheel rim-side area 38 and an actuation-side area 40. In top view, both areas are formed symmetrically about a centerline M, which lies parallel to the axis of rotation A. They are also symmetrical in relation to a radial center plane ME, which is spanned by the axis of rotation A and the centerline M. This symmetry means that the contour of the holding device is such that one and the same mold can be used for casting the caliper, irrespective of whether the caliper is designed for a right-hand or a left-hand brake.

Forming part of the actuation-side area 40 of the holding device is a projection 42 of roof edge-like design. Its lateral flanks 44, 46 serve to absorb tangential forces. Its radially inner flank 48 serves to absorb radial forces.

On the actuation side, the hold-down yoke 36 is designed to match the projection 42. For example, it comprises a recess 50, which in the assembled state accommodates the projection 42. Lateral flanks 52 and 54 of the recess 50 serve to transmit tangential forces. A radially outer face 56 serves to transmit radial forces. In the fitted state, it bears on the flank 48 of the projection 42 facing the brake disk.

In the wheel rim-side area 38, the caliper 20 comprises a threaded hole 58, into which a bolt 60 is screwed for fixing the hold-down yoke 36. Like the actuation-side area 40, the wheel rim-side area 38 of the holding device is designed symmetrically in relation to the centerline M and the center plane ME. Only the threaded hole 58 is not symmetrically situated, in order to prevent a hold-down yoke for a right-hand (left-hand) brake being fitted to a left-hand (right-hand) brake. It is not formed by casting but rather is made by means of a drill and/or a thread cutter after the actual casting of the caliper.

Figure 11:
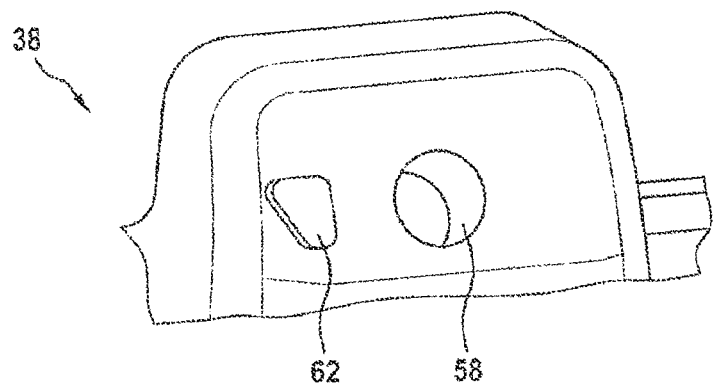
FIG. 11 is a diagrammatic, partial view of another holding area of the caliper for the hold-down yoke.
Figure 12:
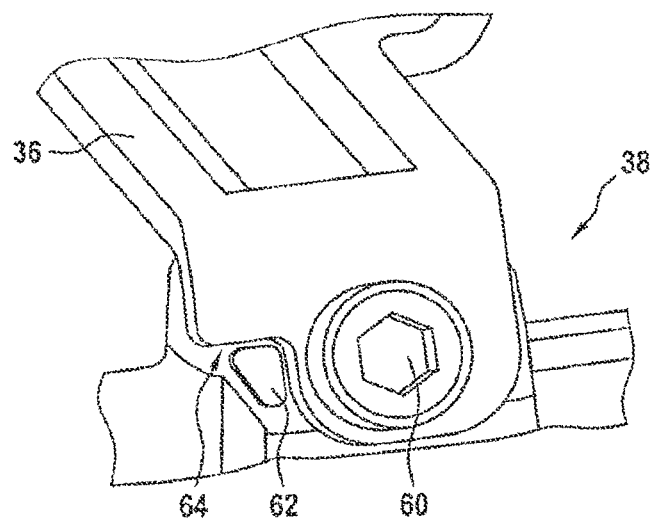
FIGS. 12 and 13 show two different embodiments of the fastening of the hold-down yoke on the wheel rim-side of the caliper.

A coding device is provided in the area 38 of the holding device. For this purpose, according to FIGS. 11 and 12, a protrusion 62 may be left during the machining, so that, according to FIG. 12, only one such hold-down yoke 36 can be fitted, which has an aperture 64 matching the protrusion 62. Like the threaded hole 58, the protrusion 62 is not formed by casting and can therefore be arranged asymmetrically.

Figure 13:
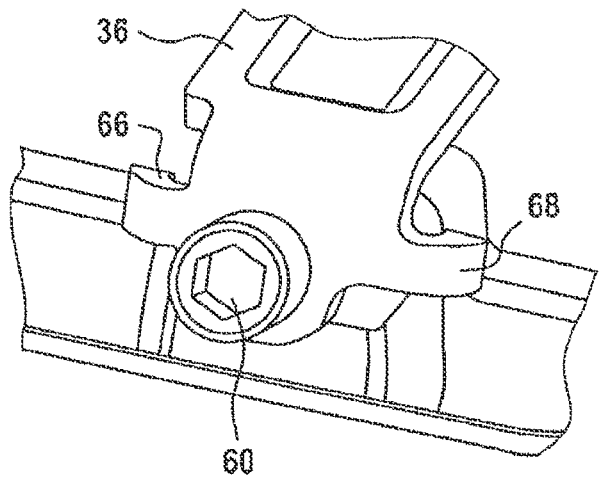

In addition or alternatively, the hold-down yoke 36 according to FIG. 13 may comprise lugs, which grip around corresponding structures on the caliper 20. This again ensures that only one matching hold-down yoke 36 can be fitted.

The protrusion 62, the aperture 64 and the lugs 66 and 68 are therefore coding devices, which ensure that only one matching hold-down yoke is ever fitted to the caliper.

The hold-down yoke is asymmetrical in two different respects. Firstly it comprises tangential shoulders 70 and 72 only on the actuation side, not on the wheel-rim side. Secondly its dimensions V1, V2 measured in a tangential direction from the centerline M are greater in the area of the first projection 70, that is on the disk run-out side, than in the area of the projection 72, that is on the disk run-in side.

This configuration makes it possible to impress a tangential pre-stressing on the actuation-side brake lining 26 and the pressure plate 28 situated on the actuation side, without the need for the brake caliper 20 to have a correspondingly asymmetrical design in the areas 38 and 40 of its holding device for the hold-down yoke 36 and without a disadvantageous tangential pre-stressing acting on the wheel rim-side brake lining 24.

Figure 7:
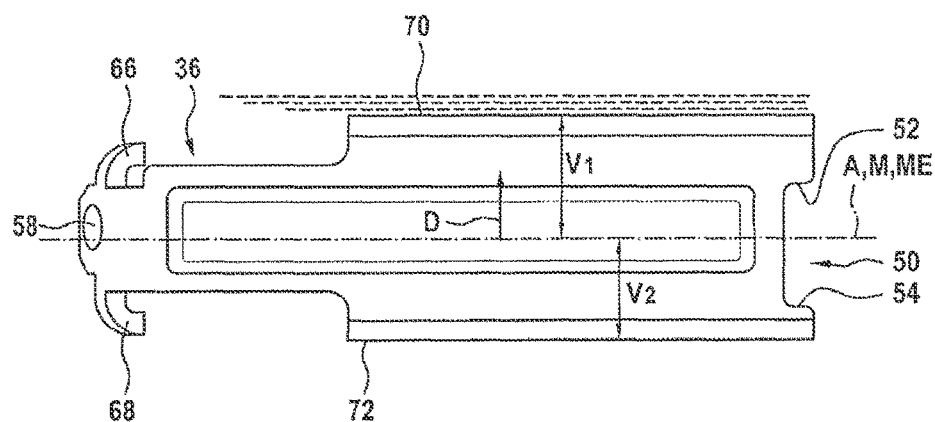
FIG. 7 diagrammatically shows a hold-down yoke of the brake according to FIGS. 3 and 4.
Figure 8:
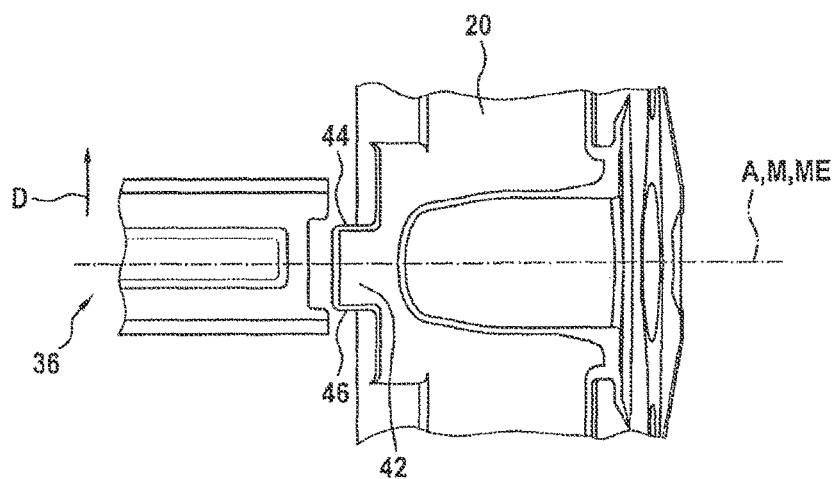
FIGS. 8 and 9 show the interaction of the hold-down yoke with the brake caliper.
Figure 9:
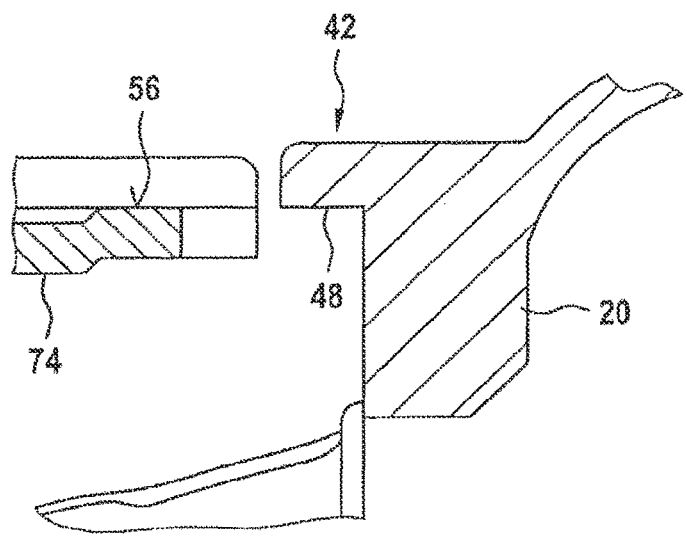
Figure 10:
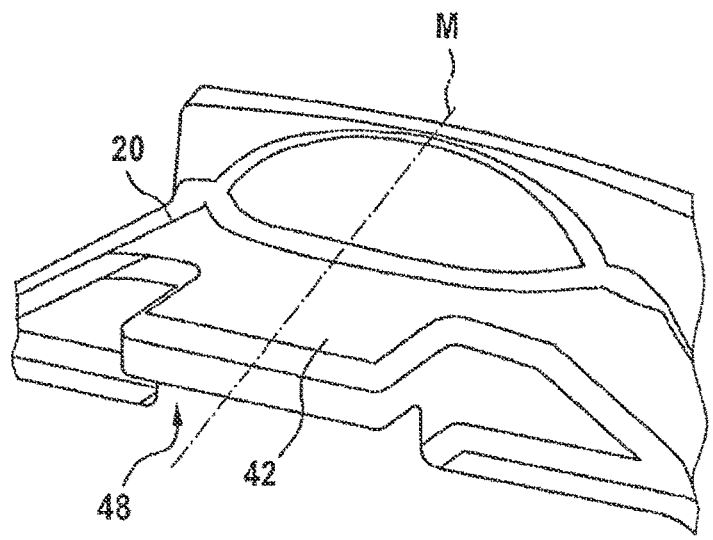
FIG. 10 is a perspective, partial view of a holding area of the brake caliper for the hold-down yoke.

It is also possible, by applying different spring pre-stresses, purposely to control the variety of interactions with the hold-down springs. This can be done in that, according to FIG. 7, it is only necessary to adjust the width V1 of the hold-down yoke in the direction of the dashed lines to the disk run-out. For this purpose, it is only necessary to shape the sheet-metal pressing accordingly. Through interaction with the abovementioned codings it is then possible to make a precise assignment to the corresponding brake and its conditions of use, without having to make adaptations to the cast areas of the brake caliper in order to do this.

The hold-down yoke 36 is preferably produced as a shaped, sheet-metal pressing and comprises a bead, which is offset in relation to the centerline M and the radial plane R according to the difference between the dimensions V1 and V2. The bead is denoted by the reference numeral 74. In the assembled state it bears flatly on the respective hold-down spring 30, 32 and 34 and impresses the radial pre-stressing, cf. FIG. 19. In the configuration according to FIG. 20, by contrast, which corresponds to the state of the art, there is only a linear bearing contact. Such a linear bearing contact imposes a considerably greater load on the hold-down spring than the flat bearing contact according to FIG. 19.

Design configurations of the hold-down spring in the form of a leaf spring can be gleaned, in particular, from FIGS. 14 to 18. It comprises two identical spring legs 76, 78 and a trapezoidal center area 80 situated between them, which projects radially inwards. In the relaxed state, the two legs of the trapezoidal area 80 each enclose an angle α of more than 95° with its base. In the exemplary embodiment represented in the drawing these angles are 117°. With each of the two adjacent spring legs 76, 78 they enclose an angle β of less than 850. In the exemplary embodiment shown the angle β is 74°.

In the side view, the springs are not angular. Rather, in the relaxed state they are each curved with a radius in each case of 10 mm to 16 mm in the transitional area between the two legs of the trapezoidal area 80 and its base, in the exemplary embodiment shown 13 mm, and in the transitional area between the trapezoidal area 80 and the spring legs 76, 78 they are curved with a radius of 4 mm to 9.5 mm, in the exemplary embodiment shown 7 mm.

Figure 14:
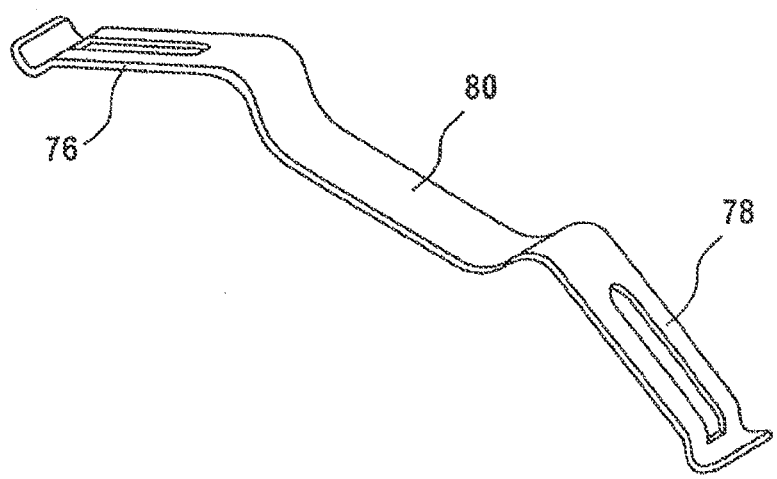
FIGS. 14 to 18 show different views of hold-down springs for the brake according to FIGS. 3 and 4.
Figure 15:
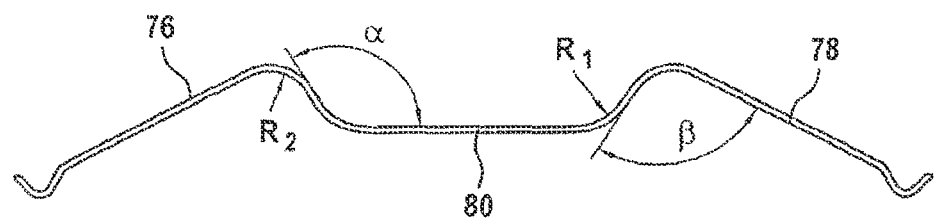
Figure 16:
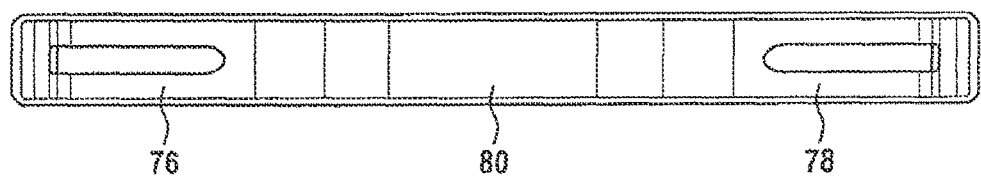
Figure 17:
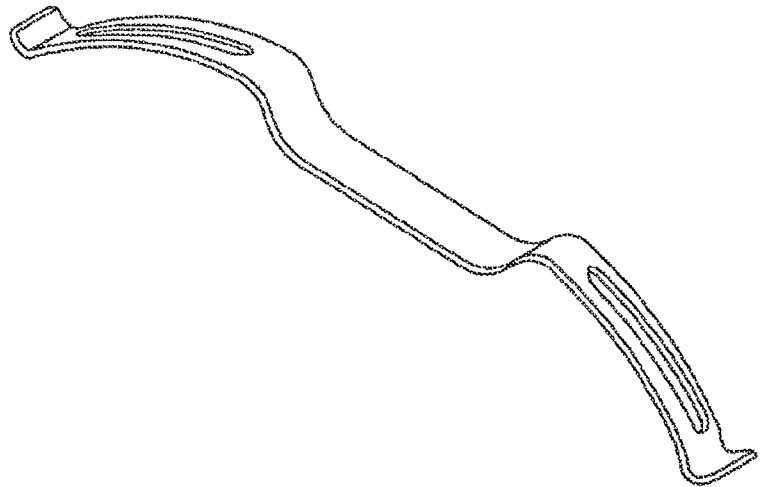
Figure 18:
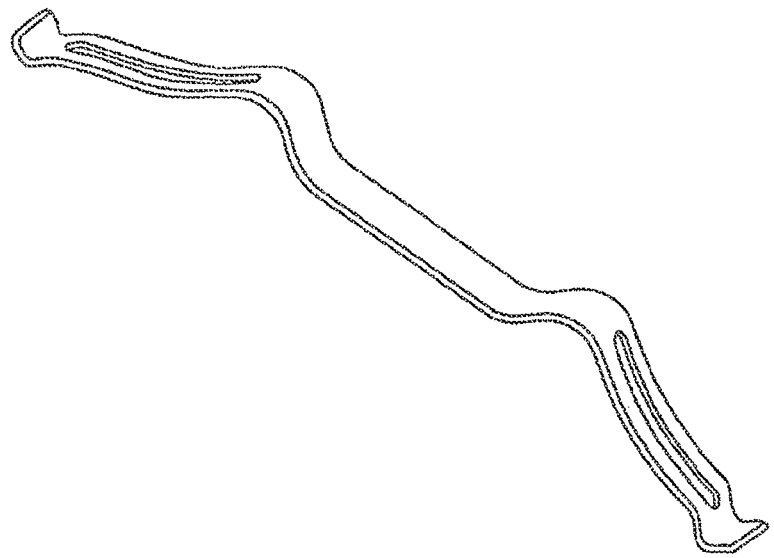

The spring legs 76, 78 may be of straight design according to FIGS. 14 to 16. They may also be of convex or concave design, however, as can be seen from FIGS. 17 and 18.

Figure 19:
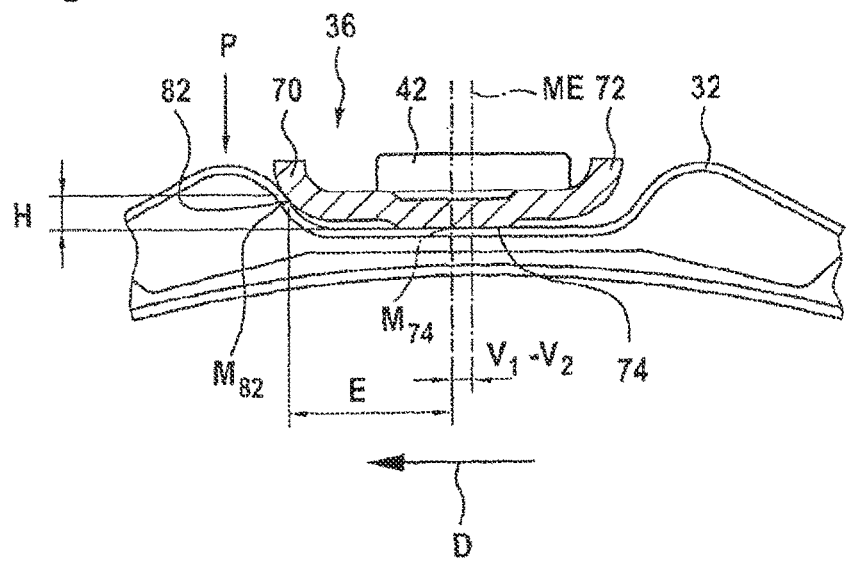
FIGS. 19 and 20 show sectional views of the interaction of the hold-down yoke with the hold-down spring according to one exemplary embodiment of the present invention and according to the state of the art.

That area of the projection 70, which bears on the hold-down spring 32 is denoted in FIG. 19 by the reference numeral 82. Its center $M_{82}$ is separated from the center $M_{74}$ by the distance H in a radial direction and by the distance E in a tangential direction, where H<E. By contrast the corresponding bearing contact lines 15 and 16 in the state of the art are such that H=E, cf. FIG. 20.

In the exemplary embodiment represented in the drawings, the site P of the greatest (compressive) stress lies in the hold-down spring 32, which is situated in the transitional area between the center area 74 and the spring leg 76, removed from the (extensive) area of the greatest wear due to friction or to the radial impact of the brake lining or the pressure plate in the contact areas.

Figure 20:
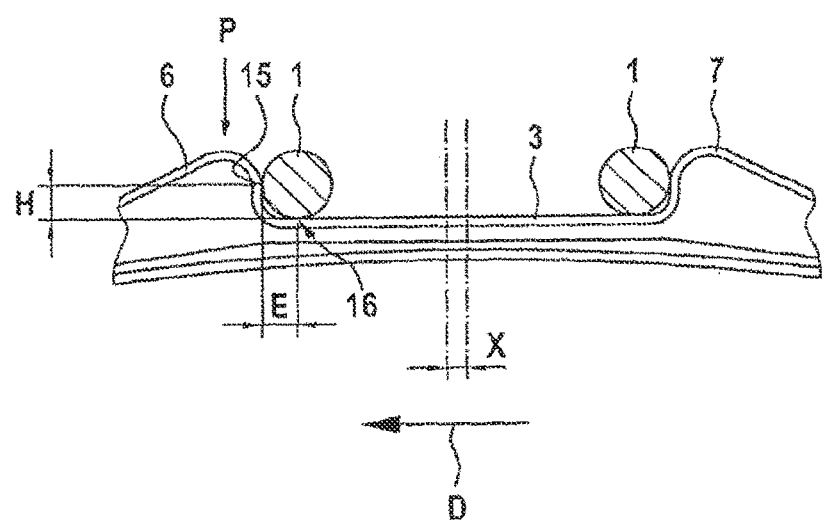

By contrast, under similar conditions of use, as specified above, according to the state of the art in FIG. 20, only a linear bearing contact occurs in the radial contact area, so that, here, the site of the greatest wear in the radial area with the linear bearing contact (see arrow) then directly and closely adjoins the area P of the greatest (compressive) stress in the hold-down spring, so that here H=E.

As can be seen from FIG. 19 in particular, the hold-down yoke 36 in cross section has a trough-like configuration, sloping away on the outside, that is at the ends of the projections 70, 72. This allows slight relative movements (sliding) during reversing movements of the hold-down spring. In the state of the art according to FIG. 20 with the round material, which bears against perpendicular spring portions, this is not the case. The inventive design reduces the stress loads in the critical zones.

Here too, as in the state of the art according to FIG. 1, the hold-down springs are coupled to the brake lining in the axial direction of the brake linings, because radial shoulders 12 of the outer edge of the brake lining pass through elongated openings 8, 9 in the two lateral spring legs of the spring. At the ends the spring legs bear against further radial shoulders 13, 13 of the outer edge of the brake lining. The hold-down springs are embodied as leaf springs.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A caliper disk brake of a vehicle, comprising:
   a brake disk having an axis of rotation;
   a brake caliper;
   a back plate assembly;
   a force transmission element guided and supported in a channel of the brake caliper or the back plate assembly;
   a hold-down spring configured to hold down the at least one force transmission elements;
   a hold-down yoke configured to pre-stress the hold-down spring radially against the force transmission element and to pre-stress the hold-down spring against the force transmission element tangentially in a direction of rotation during forward travel of the vehicle; and
   a holding device configured to hold and support the hold-down yoke on the brake caliper, the holding device having a centerline parallel to the axis of rotation of the brake disk,
   wherein a width of the hold-down yoke in the direction of rotation from a first point on a radial plane to an edge of the hold down yoke on a disk run-out side of the brake disk, the radial plane extending through the centerline and the axis of rotation of the brake disk, is greater than a width of the hold-down yoke in the direction of rotation from an edge of the hold down yoke on a disk run-in side of the brake disk to the first point on the radial plane.

2. The caliper brake as claimed in claim 1, wherein the holding device is symmetrical in relation to the radial plane containing the centerline.

3. The caliper disk brake as claimed in claim 2, wherein the holding device comprises a projection extending in a direction of the axis of rotation, lateral flanks of the projection being configured to absorb tangential forces and a radially inner flank of the projection being configured to absorb radial forces.

4. The caliper disk brake as claimed in claim 3, wherein the projection has a roof edge-like shape.

5. The caliper disk brake as claimed in claim 3, wherein the projection is disposed on an actuation side of the holding device.

6. The caliper disk brake as claimed in claim 2, wherein the holding device comprises a coding device.

7. The caliper disk brake as claimed in claim 6, wherein the coding device comprises a shoulder.

8. The caliper disk brake as claimed in claim 2, wherein the holding device comprises a threaded connection.

9. The caliper disk brake as claimed in claim 2, wherein the coding device and/or the threaded connection is/are disposed on a wheel rim-side of the holding device.

10. The caliper disk brake as claimed in claim 1, wherein the brake caliper is a sliding caliper.

11. The caliper disk brake as claimed in claim 1, wherein the at least one force transmission element is a brake-pad plate and/or a pressure plate.

12. The caliper disk brake as claimed in claim 1, wherein the brake caliper is formed by casting.

13. The caliper disk brake as claimed in claim 1, wherein the hold-down yoke comprises tangential shoulders on an actuation side but not on a wheel-rim side.

14. The caliper disk brake as claimed in claim 13, wherein the first point on the radial plane is located in the direction of rotation from an edge of a tangential shoulder of the hold-down yoke on the disk run-in side of the brake disk and in a direction opposite the direction of rotation from an edge of a tangential shoulder of the hold-down yoke on the disk run-out side of the brake disk.

15. The caliper disk brake as claimed in claim 14, wherein the first point on the radial plane is located at the actuation side of the hold-down yoke.

16. The caliper brake disk as claimed in claim 3, wherein the first point on the radial plane is located in the direction of rotation from a lateral flank of the projection on the disk run-in side of the brake disk and in a direction opposite the direction of rotation from a lateral flank of the projection on the disk run-out side of the brake disk.

17. The caliper disk brake as claim in claim 1, wherein the first point on the radial plane is located in a direction of an actuation side of the hold down yoke from a wheel-rim side of an actuation side brake lining.

* * * * *